US011054350B2

(12) United States Patent
Roszman

(10) Patent No.: US 11,054,350 B2
(45) Date of Patent: Jul. 6, 2021

(54) DUAL TESTING MACHINE THAT INCORPORATES ULTRASONIC TESTING AND COMPRESSIBILITY TESTING

(71) Applicant: Akebono Brake Industry Co., Ltd., Tokyo (JP)

(72) Inventor: Eric J. Roszman, Ovid, MI (US)

(73) Assignee: AKEBONO BRAKE INDUSTRY CO., LTD., Tokyo (JP)

(*) Notice: Subject to any disclaimer, the term of this patent is extended or adjusted under 35 U.S.C. 154(b) by 202 days.

(21) Appl. No.: 16/264,853

(22) Filed: Feb. 1, 2019

(65) Prior Publication Data
US 2020/0249136 A1 Aug. 6, 2020

(51) Int. Cl.
*G01N 3/02* (2006.01)
*G01N 3/08* (2006.01)

(52) U.S. Cl.
CPC ............... *G01N 3/02* (2013.01); *G01N 3/08* (2013.01); *G01N 2203/0085* (2013.01); *G01N 2203/0658* (2013.01)

(58) Field of Classification Search
CPC .... G01N 3/02; G01N 3/08; G01N 2203/0658; G01N 2203/0085; G01N 2291/02827; G01N 29/043; G01N 2291/102; G01N 2203/0019
See application file for complete search history.

(56) References Cited

U.S. PATENT DOCUMENTS

| 3,577,774 | A | 5/1971 | Steffens et al. |
| 3,720,098 | A | 3/1973 | Dixon |
| 3,771,354 | A | 11/1973 | Miller |
| 4,852,397 | A * | 8/1989 | Haggag ............... G01N 3/42 73/82 |
| 5,038,787 | A | 8/1991 | Antich et al. |
| 5,154,081 | A | 10/1992 | Thompson et al. |
| 5,408,882 | A | 4/1995 | McKinley et al. |
| 5,714,688 | A | 2/1998 | Buttram et al. |
| 5,741,971 | A | 4/1998 | Lacy |
| 8,689,421 | B2 | 4/2014 | Liu et al. |
| 2003/0006726 | A1 | 1/2003 | Weiberle et al. |

FOREIGN PATENT DOCUMENTS

| WO | 2018/026575 A1 | 2/2018 | |
| WO | WO-2018026575 A1 * | 2/2018 | ............. G01N 19/02 |

OTHER PUBLICATIONS

Yuhas et al., Comparative Studies of Non-destructive Methods for As-manufactured Brake Pads, SAE International, 2010.
Poudel et al., Application of Ultrasonic Non-Destructive Evaluation in Braking Materials, SAE International, 2012.
(Continued)

*Primary Examiner* — Xin Y Zhong
(74) *Attorney, Agent, or Firm* — The Dobrusin Law Firm, P.C.; Bryan S. Lemanski

(57) ABSTRACT

A testing machine comprising: (a) a transmitter; (b) a receiver opposing the transmitter; and (c) a compressibility sensor in communication with the transmitter, the receiver, or both, wherein the testing machine transmits a signal between the transmitter and the receiver to perform ultrasonic testing and further performs compressibility testing of one or more objects positioned between the transmitter and the receiver.

20 Claims, 8 Drawing Sheets

(56) References Cited

OTHER PUBLICATIONS

Yuhas et al., Non-Destructive Ultrasonic Methods for Quality Assurance of Brake Pads, EuroBrake, 2012.
Yuhas et al., Non-linear Aspects of Friction Material Elastic Constants, SAE International, 2006.
Potentially related copending U.S. Appl. No. 62/640,695, filed Mar. 9, 2018.
Potentially related copending U.S. Appl. No. 62/652,974, filed Apr. 5, 2018.

* cited by examiner

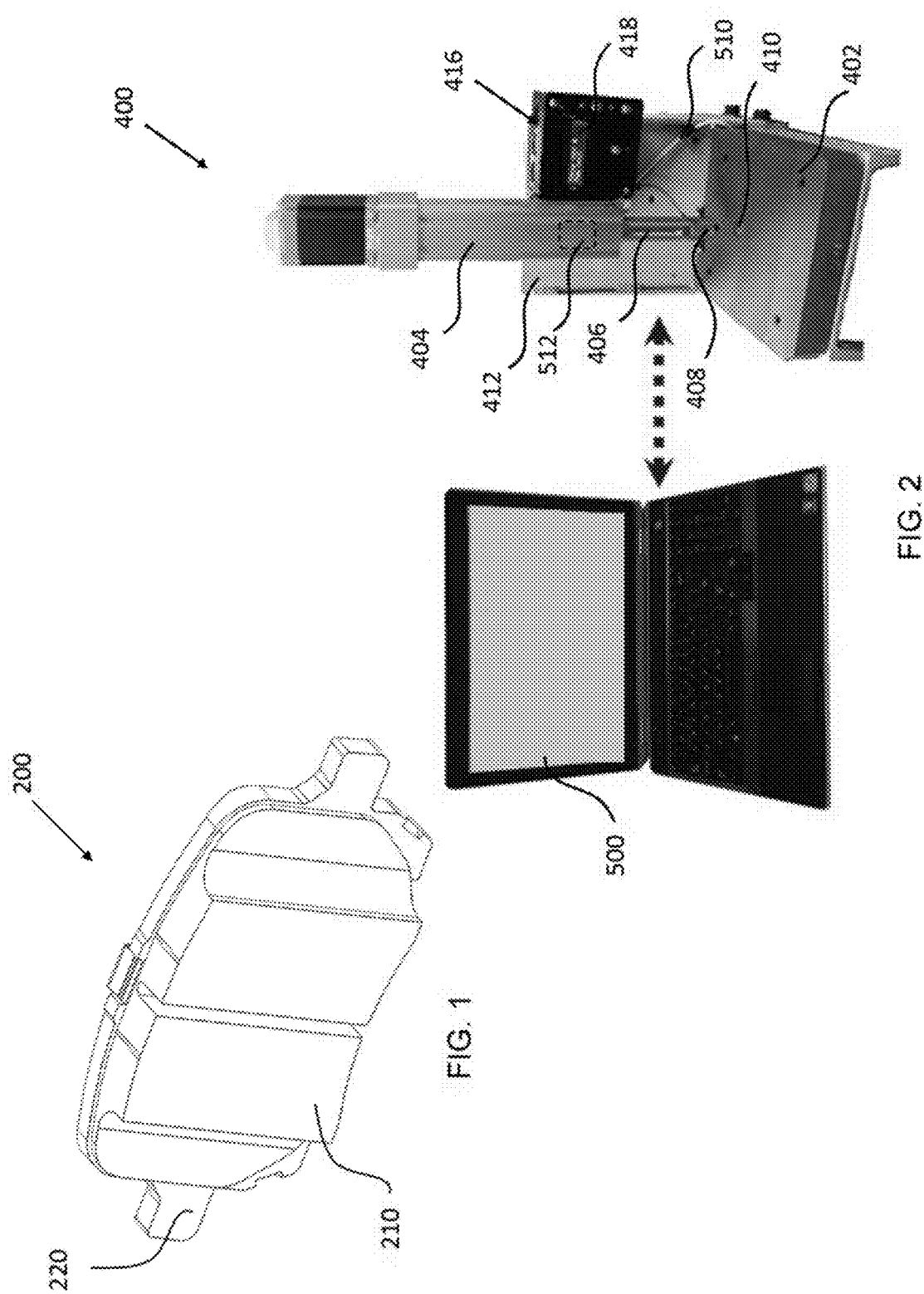

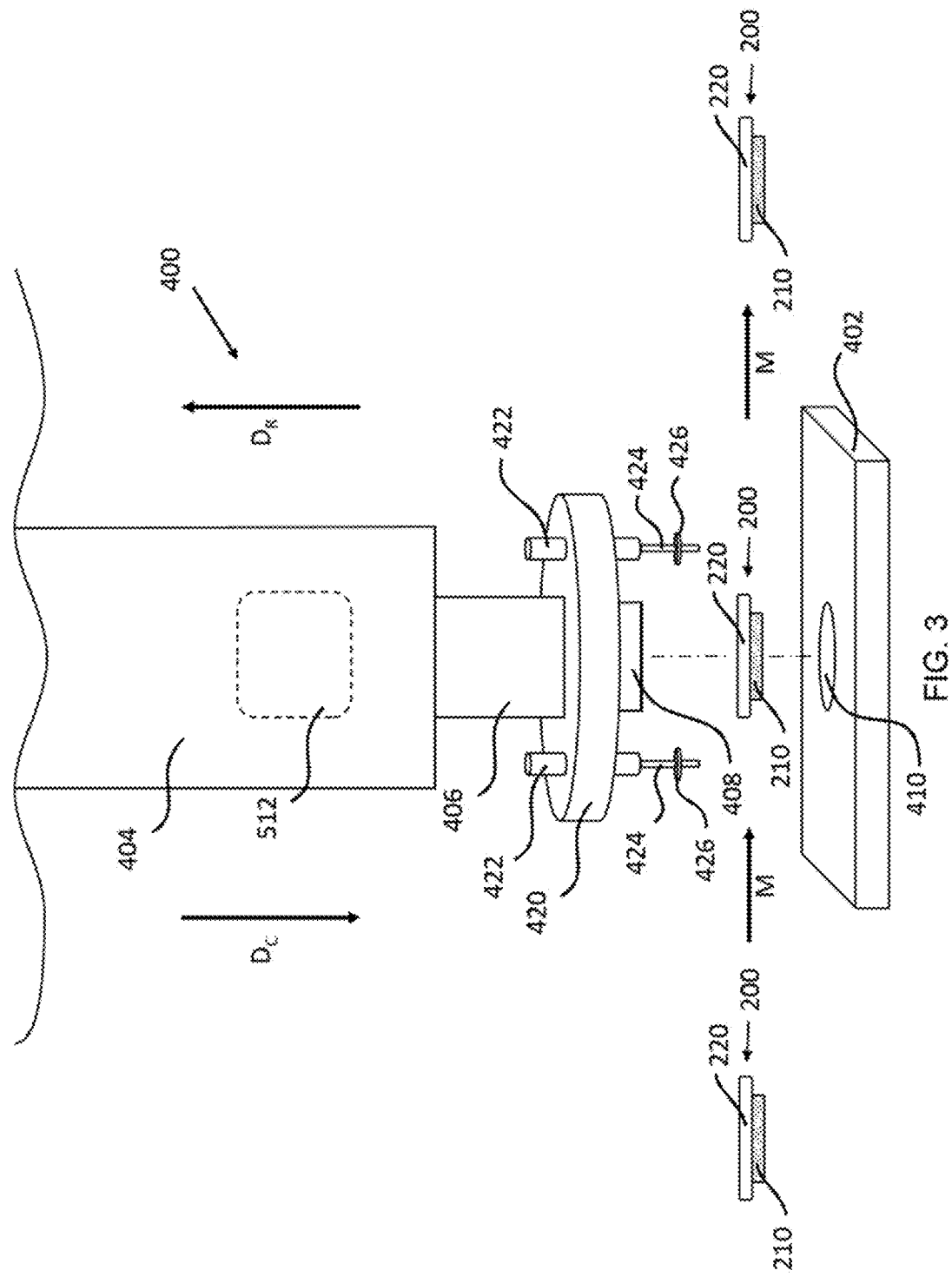

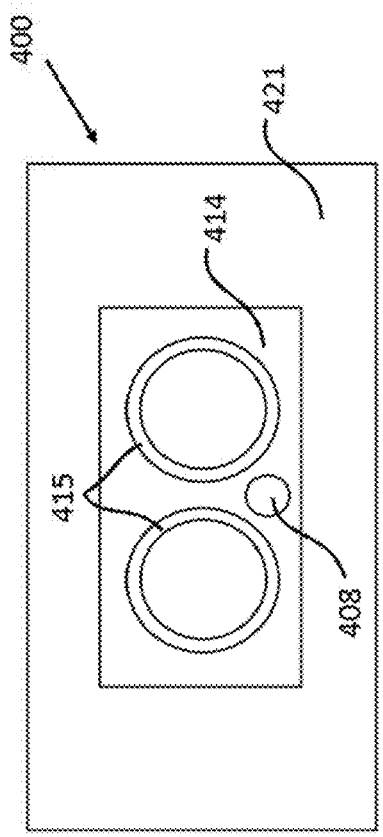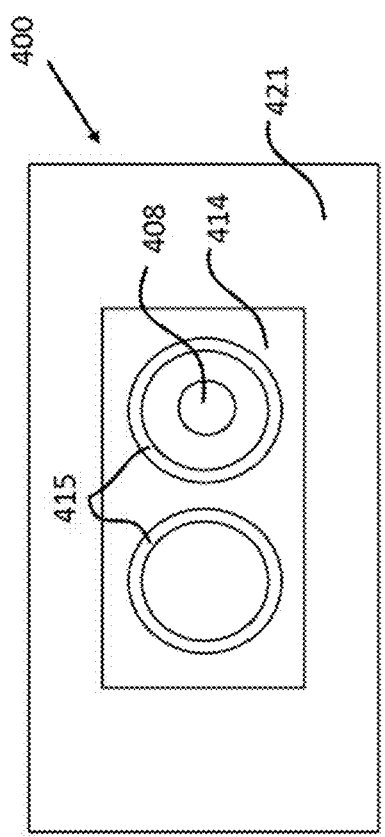

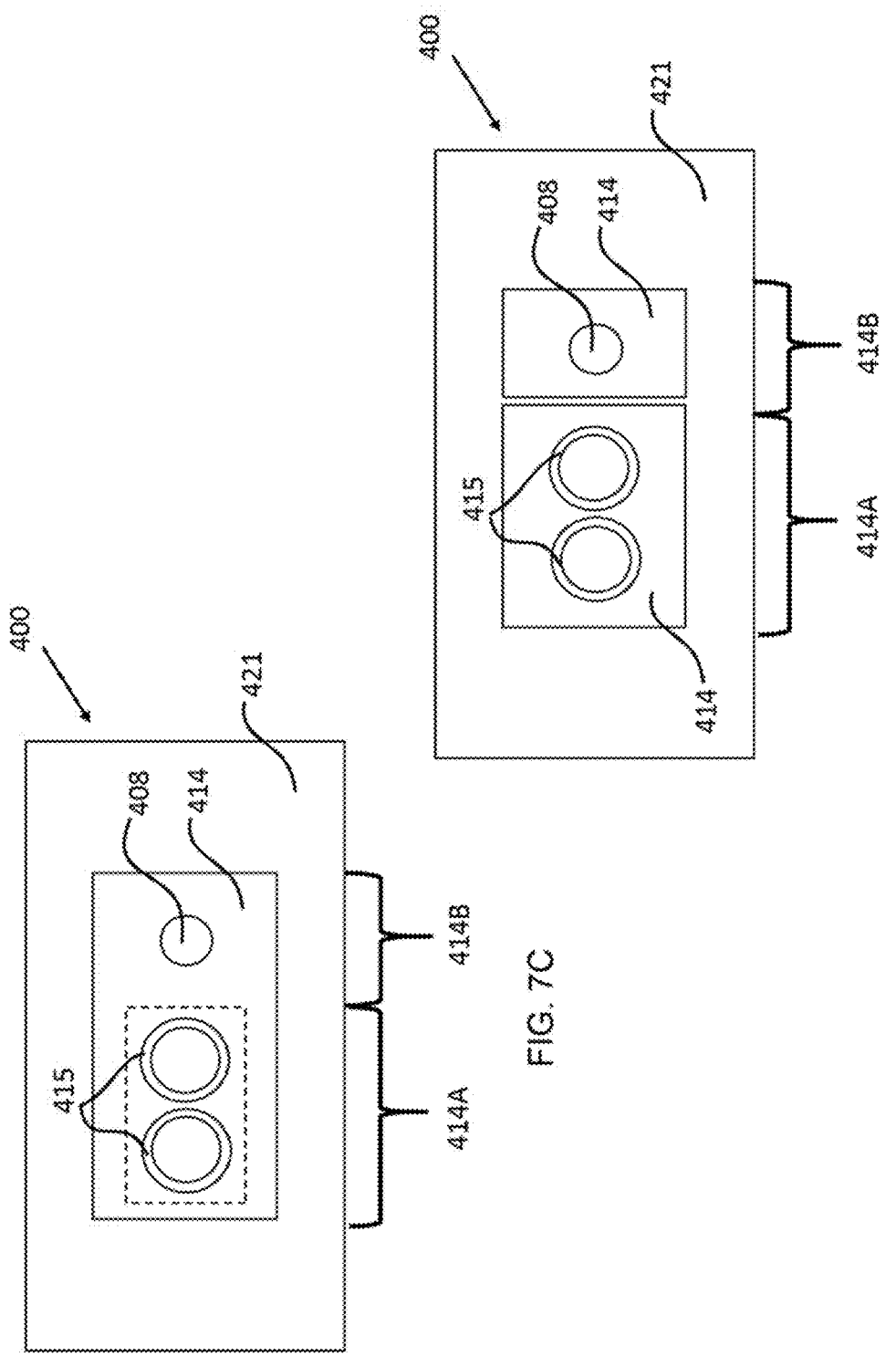

DUAL TESTING MACHINE THAT INCORPORATES ULTRASONIC TESTING AND COMPRESSIBILITY TESTING

FIELD

The present teachings generally relate to the testing of materials, and more particularly, to ultrasonic and compression testing of friction materials for a brake pad.

BACKGROUND OF THE INVENTION

Friction materials are used in a variety of applications to decelerate a vehicle, such as an automobile, motorcycle, or airplane. Frequently, the friction materials are also used to prevent movement of a stationary vehicle, parked vehicle, or both. One or more frictions materials are frequently applied to a pressure plate to form a brake pad. One or more of the brake pads may be used within a brake system to perform a brake apply to the vehicle by moving the one or more brake pads into contact with a rotating brake rotor to create a clamping force. The clamping force in turn functions to decelerate the vehicle.

Friction materials are frequently manufactured using a variety of processes, including: mixing of raw materials; forming the raw materials into a desired shape of the friction material under heat, pressure, or both; curing the formed shape; grinding of the friction material, scorching of the friction material, or both to remove surface debris or imperfections; painting the pressure plate, friction material, or both; or a combination thereof. The friction material is then assembled with the pressure plate and one or more additional components to form the brake pads. Due to the manufacturing of friction materials requiring a variety of processes, differences in equipment, differences in raw material, and a number of other manufacturing variables that may affect the friction material, measurements of the friction materials may need to be taken to ensure that the friction materials meet certain regulations or requirements and/or control one or more of the manufacturing variables.

Accordingly, friction materials may be tested to determine if the friction materials meet various performance and quality requirements. Specifically, in the automotive industry, requirements are set by the government, original equipment manufacturers (OEM) that purchase the friction materials for their vehicles, and consumers. For example, the federal government sets forth a plurality of requirements for friction materials in Federal Motor Vehicle Safety Standard (FMVSS) 105 and 135 in the United States, while OEMs define their own internal standards that cover product performance under different operating conditions, durability, safety, and product life cycles.

As a result of the performance and quality demands, friction material manufacturers are frequently required to perform laboratory testing to evaluate the friction material and determine if the friction material meets the requirements. The testing may require a variety of equipment to determine various characteristics of the friction material, such as: elasticity, compressibility, hardness, flatness and parallelism, shear strength, visual deformities, chemical composition, moisture content, particle size distribution, or a combination thereof. However, the testing often requires a manufacturer to remove the friction material from the manufacturing line, wait until the friction material is complete before testing, or both, resulting in increased manufacturing cycle times, increased cost, and/or increased scrap. Furthermore, testing may require a plurality of machines to determine if multiple properties of the friction material are within specification. Additionally, because the testing is often performed after the friction material comes off the manufacturing line (i.e., after manufacturing of the friction material, but prior to packaging), the testing is performed as a quality-inspection that determines if the friction material is acceptable or must be scrapped, resulting in a high level of material waste. Alternatively, the testing may be performed on a sample part taken from a batch of friction materials. However, frequently the sample testing is destructive and damages the sample part, also resulting in a high level of material waste.

Examples of friction material testing equipment used during manufacturing are disclosed in U.S. Pat. Nos. 3,577,774; 3,720,098; 3,771,354; 4,852,397; 5,038,787; 5,154,081; 5,408,882; 5,714,688; 5,741,971; and 8,689,421; U.S. Patent Publication No. 2003/0006726; and International Publication No. WO 2018/026575, all of which are incorporated by reference herein for all purposes. It would be attractive to have testing equipment that performs a plurality of tests on the friction material to determine one or more material properties. What is needed is a testing machine that simultaneously or sequentially performs multiple tests, such as compressibility testing, ultrasonic testing, or both. It would be attractive to have testing equipment that performs the inspection of the friction material prior to the manufacturing process being completed. What is needed is an inline testing machine that performs the inspection of the friction material during the manufacturing process. It would be attractive to have testing equipment that conducts testing without damaging the friction material being tested. What is needed is a dual testing machine that performs compressibility testing and ultrasonic testing on the friction material in a nondestructive manner. It would be attractive to have testing equipment that performs testing of the friction material under conditions similar to the conditions when the friction material undergoes normal operation. What is needed is a testing machine that performs compressibility testing using one or more plates shaped like one or more brake pistons.

SUMMARY

The present teachings meet one or more of the present needs by providing a testing machine comprising: (a) a transmitter; (b) a receiver opposing the transmitter; and (c) a compressibility sensor in communication with the transmitter, the receiver, or both, wherein the testing machine transmits a signal between the transmitter and the receiver to perform ultrasonic testing and further performs compressibility testing of one or more objects positioned between the transmitter and the receiver.

The present teachings meet one or more of the present needs by providing a method, comprising the steps of: (a) placing one or more friction materials of one or more brake pads on the receiver of the testing machine; (b) moving the transmitter positioned on the distal end of the shaft opposing the receiver to compress the one or more friction materials between the transmitter and the receiver; and (c) performing ultrasonic testing and compressibility testing within a manufacturing line of the one or more friction materials to determine if each of the one or more friction materials meet one or more desired material properties.

The present teachings meet one or more of the present needs by providing a testing machine comprising: (a) a transmitter positioned near a distal end of a movable shaft; (b) a receiver opposing the transmitter and positioned on a base of the testing machine; (c) a compressibility sensor in communication with the transmitter, the receiver, or both; and (d) a compression plate compressibly engaged to the base via one or more biasing members, wherein the compression plate supports one or more friction materials of one or more brake pads.

The present teachings provide: testing equipment that performs a plurality of tests on the friction material to determine one or more material properties; a testing machine that simultaneously or sequentially performs multiple tests, such as compressibility testing, ultrasonic testing, or both; testing equipment that performs the inspection of the friction material prior to the manufacturing process being completed; an inline testing machine that performs the inspection of the friction material during the manufacturing process; testing equipment that conducts testing without damaging the friction material being tested; a dual testing machine that performs compressibility testing and ultrasonic testing on the friction material in a nondestructive manner; testing equipment that performs testing of the friction material under conditions similar to the conditions when the friction material undergoes normal operation; a testing machine that performs compressibility testing using one or more plates shaped like one or more brake pistons; or a combination thereof.

BRIEF DESCRIPTION OF THE DRAWINGS

FIG. 1 is a perspective view of a brake pad;

FIG. 2 is a perspective view of a combination ultrasonic and compressibility testing machine;

FIG. 3 is a close-up perspective view of a combination ultrasonic and compressibility testing machine;

FIG. 7A is an illustrative example of cross-section 7-7 of FIG. 6;

FIG. 7B is an illustrative example of cross-section 7-7 of FIG. 6;

FIG. 7C is an illustrative example of cross-section 7-7 of FIG. 6 having a compressibility portion and an ultrasonic testing portion;

FIG. 7D is an illustrative example of cross-section 7-7 of FIG. 6 having a compressibility portion and an ultrasonic testing portion.

DETAILED DESCRIPTION

Figure 4:
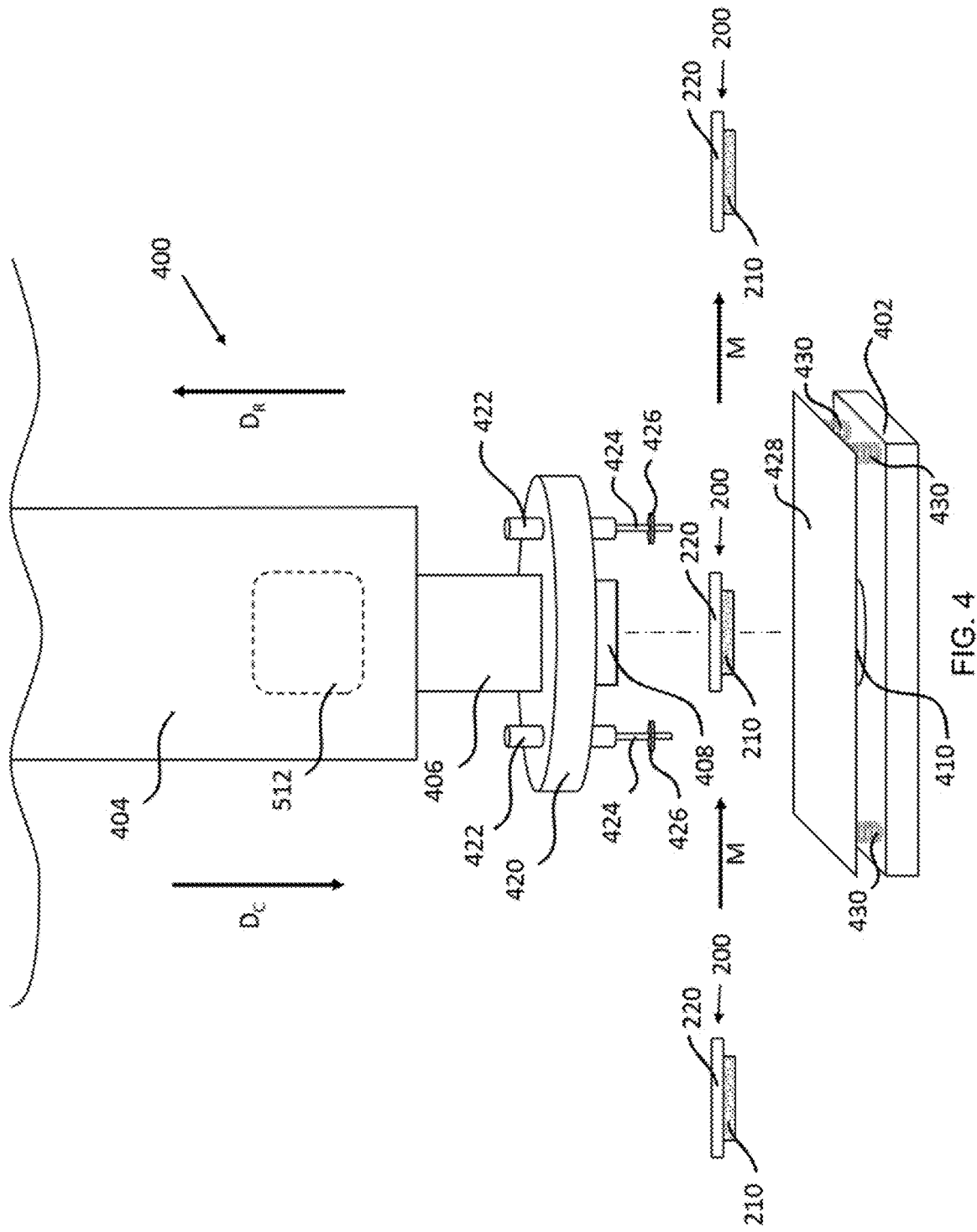
FIG. 4 is a close-up perspective view of a combination ultrasonic and compressibility testing machine.

The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the description herein, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The teachings herein relate to a friction material for a brake system. The friction material (e.g., brake pad or brake shoe) may be manufactured using a variety of methods, processes, stages, manufacturing variables, or a combination thereof. During or after completion of manufacturing the friction material, the friction material may be assembled to a pressure plate to form a brake pad. The friction material may be packaged as a separate component or as an assembly with the brake pad (i.e., attached to a pressure plate). At any point during or after manufacturing, the friction material may be tested, inspected, or both for material characteristics, quality assurance, or both. One or more testing machines may test the friction material, inspect the friction material, or both for material characteristics, quality assurance, or both.

The testing machine may function to perform two or more tests to determine material properties of the friction material, measure one or more dimensions of the friction material, determine whether the friction material meets one or more standards or requirements, or a combination thereof. The two or more tests may include: compressibility, elasticity (e.g., Young's modulus), pull-strength, chemical composition, ultrasonic, dimensional, adhesion, crush resistance, break strength, bending, creep, coefficient of friction, durability, friction, puncture, rupture, or a combination thereof. The material properties of the friction material determined by the testing machine may include: elasticity, compressibility, hardness, flatness and parallelism, shear strength, visual deformities, chemical composition, moisture content, particle size distribution, or a combination thereof. The testing machine may perform a single test or may perform a plurality of tests. The testing machine may perform a plurality of tests sequentially, simultaneously, or both. For example, the testing machine may perform compressibility testing and ultrasonic testing simultaneously by compressing the friction material between a pair of plates and sending an ultrasonic signal through the friction material while compressed. Alternatively, the testing machine may perform compressibility testing of the friction material in a first section, move the friction material to a second section, and perform ultrasonic testing on the friction material in the second section. The testing machine may determine one or more dimensions of the friction material. For example, the testing machine may conduct ultrasonic testing to determine a thickness of the friction material. The testing machine may conduct testing within a manufacturing line, outside of the manufacturing line as a secondary operation, or both. For example, the friction material may pass through the testing machine in a manufacturing direction within the manufacturing line. The testing machine may provide feedback to one or more manufacturing stages, provide feed-forward communication to one or more future manufacturing stages, provide feedback to maintain manufacturing equipment, or a combination thereof. The testing machine may be configured to test one or more brake pads. For example, the testing machine may test material properties of one or more friction materials of a brake pad, one or more brake pad assemblies having a friction material disposed on a pressure plate, or both. A plurality of testing machines may be used to increase accuracy of the testing conducted, increase productivity of the testing conducted, provide varying tests between testing machines (e.g., a first testing machine conducts ultrasonic testing while a second testing machine conducts compressibility testing), or a combination thereof. For example, two or more testing machines may be used, three or more testing machines may be used, or four or more testing machines may be used at a testing stage. Seven or less testing machines may be used, six or less testing machines may be used, or five or less testing machines may be used at a testing stage. The testing machine may be structurally rigid while one or more friction materials pass through the testing machine for testing. The testing machine may include one or more dynamic components that move the testing machine to the one or more friction materials.

The testing machine may include a base. The base may function to support one or more friction material parts during testing. The base may be flexible. The base may be sufficiently rigid to support the one or more friction materials during ultrasonic testing. For example, the base may maintain a position of the friction material part during compression of the friction material part between a transmitter and a receiver of the testing machine. The base may be substantially flat. The base may be planar with one or more surfaces of the manufacturing line. For example, the base may be coplanar with a conveyor belt of the manufacturing line so that the friction material directly moves from the conveyor belt to the base. The base may be integrally formed with one or more surfaces of the manufacturing line. For example, the base may be a section of the conveyor belt such that each friction material continuously passes through the testing machine without moving the friction material to a separate surface or station. The base may be sufficiently flat to maintain a position of the friction material. The base may include one or more fastening features to maintain the position of the friction material during. For example, the base may include one or more fixtures, one or more clamps, or both to maintain the position of the friction material. The base may be metallic, plastic, or both. The base may house one or more additional components of the testing machine. For example, the base may house a transmitter, a receiver, a controller, a display, or a combination thereof. The base may include a compression plate that supports a friction material during testing.

The compression plate may function to support a friction material before testing, during testing, after testing, or a combination thereof. The compression plate may function to elevate the friction material above a transmitter, receiver, or both when the compression plate is not compressed so that wear to the transmitter, receiver, or both is prevented by contact with the friction material. The compression plate may function to compress during testing so that the compression plate contacts a transmitter, receiver, or both located in the base. For example, a friction material may be positioned on the compression plate and a piston plate insert connected to a shaft of the testing machine may compress the friction material in a compression direction until the compression plate contacts the base of the testing machine, thereby sandwiching the friction material between the shaft and the compression plate abutting the base. After the shaft of the testing machine is released and moved in a release direction, the compression plate may return to an original uncompressed position. The compression plate may compress in a direction substantially perpendicular to a surface of the base. The compression plate may compress in a direction other than substantially perpendicular to the surface of the base. The compression plate may compress evenly so that the compression plate abuts a surface of the base and is substantially flat. Alternatively, the compression plate may compress unevenly so that one or more portions of the compression plate contact the base while one or more additional portions remain free of contact with the base. The compression plate may vary in thickness. The compression plate may have a thickness of about 0.5 mm or more, about 1 mm or more, or about 2 mm or more. The compression plate may have a thickness of about 5 cm or less, about 4 cm or less, or about 3 cm or less. The compression plate may be substantially planar or may include one or more contoured surfaces. For example, the compression plate may include a recess to receive a friction material for testing. The compression plate may have dimensions substantially similar to the base. The compression plate may be flexible. The compression plate may be sufficiently rigid to support one or more friction materials, compression of the compression plate, or both. The compression plate may be a solid material. The compression plate may be solid and the transmitter, receiver, or both may contact and compress both the compression plate and the friction material during testing. Preferably, the compression plate includes one or more apertures. The one or more apertures may be sufficiently large so that the transmitter, receiver, or both extends into the one or more apertures, through the one or more apertures, or both when the compression plate is compressed. The transmitter, receiver, or both may extend through the apertures and into contact with the friction material when a force is applied to the friction material so that the transmitter, receiver, or both directly contacts the friction material. The compression plate may be in direct contact with the friction material. A contact layer may be located over the compression plate.

The contact layer may function to prevent direct contact between the friction material and the compression plate, prevent the friction material, debris, or both from extending beneath the compression plate, extending through the one or more apertures in the compression plate into contact with transmitter, receiver, or both, or a combination thereof. The contact layer may cover the entire compression plate. The contact layer may cover only the one or more apertures. The contact layer may include a low-friction coating or may be made of a low-friction material. The contact layer may be made of or include a biaxially-oriented polyethylene terephthalate (BoPET), polytetrafluoroethylene (PTFE), polyvinyl fluoride (PVF), or a combination thereof. The compression plate, the contact layer, or both may be compressibly engaged to the base via one or more biasing members.

The biasing members may function to bias a position of the compression plate, a friction material on the compression plate, or both relative to the base, a transmitter, a receiver, or a combination thereof. The biasing members may provide a biasing force to maintain a gap between the compression plate and the base when free of a compression force being applied by the testing machine (e.g., the shaft of the testing machine). The gap may be sufficiently large so that, as a friction material is moved into a testing position or being removed from a testing position, the gap separates the transmitter, the receiver, or both and the friction material. The gap may be any gap where the compression plate prevents direct contact between the friction material and the transmitter the receiver, or both. The gap may be about 1 cm or more, about 2 cm or more, or about 3 cm or more. The gap may be about 6 cm or less, about 5 cm or less, or about 4 cm or less. The biasing members may be positioned between the compression plate and the base, between the compression plate and a guide plate or piston plate of the testing machine, or both. The biasing members may be positioned along a peripheral edge of the compression plate or anywhere along an interior surface of the compression plate. A plurality of biasing members may support the compression plate or a single biasing member may support the compression plate.

The biasing members may be a spring, coil, band, foam, other type of elastic mechanism, or a combination thereof. The biasing members may provide a sufficient force to prevent contact between the friction material and the transmitter, receiver, or both during addition or removal of the friction material from the tester. The total force provided by the one or more biasing members and preferably the plurality of biasing members may be about 2 N or more, preferably about 4 N or more, more preferably about 6 N or more, or most preferably about 10 N or more. The total force provided by the one or more biasing members and preferably the plurality of biasing members may be about 50 N or less, about 40 N or less, or about 30 N or less. The total force may be divided by the total number of biasing members in contact with the compression plate. Thus, for example, if the total force is 40 N and there are 4 biasing members, each biasing member will provide about 10 N of force on the compression plate. The biasing members may be secured to the base, compression plate, or both by adhesives, fasteners, or both. Alternatively, the biasing members may be mechanically secured to the base, compression plate, or both. For example, an end portion of the biasing members may be received by one or more receiving features (e.g., holes) located on the base, compression plate, or both.

A wall may protrude from the base. The wall may be secured to one or more peripheral sides of the base. The wall may function to support one or more components of the testing machine. The wall may protect one or more friction material parts being tested from debris, moisture, or both. The wall may extend along one or more peripheral sides of the base. The wall may extend along an entire length of the one or more peripheral sides or just a portion of the one or more peripheral sides. The wall may be substantially perpendicular to a surface of the base. The wall may extend at an angle other than substantially perpendicular to a surface of the base. The wall may extend at an angle of about 15 degrees or more, about 30 degrees or more, or about 45 degrees or more relative to the base. The wall may extend at an angle of about 90 degrees or less, about 75 degrees or less, or about 60 degrees or less relative to the base. The wall be structural rigid or may be flexible. The wall may be transparent. The wall may include one or more holes, protrusions, notches, fasteners, threading, or a combination thereof to secure one or more components.

A tower of the testing machine may be secured to a surface of the wall. The tower may function to house a movable shaft, a transmitter, a receiver, or a combination thereof. The tower may function to position the movable shaft, transmitter, receiver, or a combination thereof over a position of the base. The tower may include one or more movable parts to move the shaft, transmitter, receiver, or a combination thereof. For example, the tower may include an actuator, motor, biasing member, threaded member (e.g., a spindle), lever, or a combination thereof. The tower may include one or more boreholes, cavities, or both to house one or more components of the testing machine. The tower may be positionable relative to the base, the wall, or both. For example, the wall may include one or more tracks and the tower moves along the one or more tracks to reach a desired position. The tower may be detachable from the wall. The tower may be permanently fixed to the wall.

A shaft may extend from the tower to a position over the base of the testing machine. The shaft may function to position a transmitter, receiver, or both over the base. For example, the shaft may include a transmitter near a distal end and position the transmitter substantially directly above an opposing receiver located in the base of the testing machine so that a friction material may be sandwiched between the transmitter and the receiver. The shaft may be movable. For example, the shaft may extend into, and out from, a cavity of the tower during operation. The shaft may include one or more attachments to accommodate one or more different transmitters, receivers, or both. For example, the one or more attachments may vary in size and shape depending on the friction material size and shape being manufactured. The one or more attachments may be secured to the shaft via one or more fasteners, one or more adhesives, or both. The shaft may include a friction modifier along an exterior surface to decrease friction between the shaft and the tower during movement. The friction modifier may be grease, oil, other lubricant, or a combination thereof. The shaft may include a guide plate that guides the shaft to contact the friction material during testing.

The guide plate may function to guide the shaft in a desired direction. The guide plate may function to guide a transmitter, receiver, or both secured to a distal end of the shaft in a desired direction to contact a friction material during testing. For example, the guide plate may guide the transmitter, receiver, or both in a direction substantially perpendicular to a surface of the friction material so that a surface of the transmitter, receiver, or both substantially abuts the surface of the friction material in a planar manner. The guide plate may have a diameter similar to the shaft or may have a diameter that is different. For example, the guide plate may have a diameter greater than the shaft so that a friction material may be contacted by the shaft without contacting one or more guide pins located along a peripheral edge of the guide plate. The guide plate may maintain a position of the friction material between a receiver and transmitter of the testing machine so that information may be relayed between the testing machine and an electronic device via wires connecting the electronic device and the testing machine. The guide plate may be any size and shape based on a desired configuration of the testing machine. For example, the guide plate may be square, rectangular, trapezoidal, oval, triangular, or a combination thereof.

The guide plate may include one or more pins that function to maintain a distance between the guide plate and the base, the compression plate, or both. The one or more pins may contact the base, the compression plate, or both to prevent further travel of the guide plate. For example, the guide plate may extend towards a friction material or brake pad in a compression direction until one or more pins contact the base and stop further movement of the guide plate in the compression direction. The pins may extend substantially perpendicular to a surface of the guide plate or extend at an angle other than substantially perpendicular (i.e. less than or greater than approximately 90 degrees relative to the surface of the guide plate). The pins may be received by one or more holes of the guide plate. The guide plate may be free of pins. The pins may retractably extend from one or more sleeves of the guide plate.

The one or more sleeves may function to house the pins. The one or more sleeves may include one or more biasing members to bias a position of the pins so that, during a movement in the compression direction, the biasing members are compressed and the pins move into the sleeve. When the guide plate is moved in an opposing release direction, the guide pins return to their initial position via the biasing members. The sleeves may be substantially perpendicular to the guide plate or may be at an angle other than substantially perpendicular. If the guide plate is free of pins then the guide plate may be free of sleeves. The sleeves may be integrally formed with the guide plate or secured to the guide plate. The sleeves may be inserted into one or more holes of the guide plate. One or more nuts secured to the pins may prevent retraction of the pins into the sleeves beyond a desired position.

The one or more nuts may function to prevent unwanted movement of the pins within the sleeve. The one or more nuts may be positioned anywhere along the pins to adjust a travel distance of the guide plate. The one or more nuts may be threaded to receive a threading of the pins. The one or more nuts may be removably attached or may be permanently fixed to the pins. The one or more nuts may be adjustable along a length of the pins. The one or more nuts may abut a peripheral edge of the one or more sleeves when the guide plate has moved in the compression direction to a maximum travel distance (i.e., the pins have "bottomed out"). The one or more nuts may stop the brake pads or friction material from being compressed by the guide plate insert beyond a desired distance to prevent damage to the brake pads or friction material.

A piston plate may be connected to, or integrally formed with, the shaft of the testing machine. The piston plate may function to simulate one or more brake pistons contacting and compressing one or more friction materials, one or more brake pads, or both during testing. The piston plate may function to simulate one or more brake pistons of a brake assembly or a braking system of a vehicle (e.g., a braking system including one or more brake calipers). The piston plate may function to contact, compress, or both the one or more friction materials, one or more brake pads, or both. The piston plate may be moved via the shaft of the testing machine. For example, the shaft may move the piston plate in a compression direction to contact the one or more friction materials, one or more brake pads, or both. Additionally, the shaft may move the piston plate in a direction opposing the compressing direction. The piston plate may be secured to the shaft of the testing machine via one or more fasteners, one or more adhesives, or both. The piston plate may be free of fasteners and adhesives to secure the piston plate to the shaft. For example, the piston plate may be magnetically secured to the shaft or integrally formed with the shaft. The piston plate may be any size and shape to compress a desired shape of one or more friction materials, one or more brake pads, or both. The piston plate may be rectangular, square, triangular, circular, oval, trapezoidal, or a combination thereof. The piston plate may substantially similar in size to the base of the testing machine. The piston plate may be dimensionally smaller or larger than the base of the testing machine. The piston plate may vary in thickness (i.e., a dimension of the piston plate measured along a length of the piston plate substantially parallel to a direction of compression) based on a desired compression force necessary for testing the one or more friction materials, one or more brake pads, or both. The piston plate may customizable within the configuration of the testing machine. For example, a plurality of piston plates having different dimensions may be interchangeable within the testing machine. A plurality of piston plates may be secured to a plurality of shafts to simultaneously test a plurality of friction materials, brake pads, or both. The piston plate may be sufficiently rigid to create a compression force on the one or more friction materials, one or more brake pads, or both. The piston plate may be compressed a desired amount during compressibility testing of the one or more friction materials, one or more brake pads, or both to simulate movement of one or more fingers of a brake caliper system during braking. The piston plate may be metal, plastic, stone, or a combination thereof. The piston plate may secure one or more piston plate inserts to a surface of the piston plate.

The piston plate insert may function to contact one or more friction materials, one or more brake pads, or both during testing. The piston plate insert may function to contact the one or more friction materials, one or more brake pads, or both during compressibility testing, ultrasonic testing, or both to mimic the compression of a friction material or brake pad during vehicle braking. The piston plate insert may secure to a face of the piston plate or one or more peripheral edges. The piston plate insert may abut a surface of the piston plate so that the piston plate insert is substantially flush with a surface of the piston plate (e.g., during a magnetic joining of the piston plate insert and the piston plate). The piston plate insert may be secured to the piston plate via one or more mechanical fasteners, one or more adhesives, or both. For example, the piston plate may include one or more tracks that receive a portion of the piston plate insert so that the piston plate insert is secured by the one or more tracks and abuts a surface of the piston plate. Alternatively, the piston plate may include one or more keys that are received by one or more apertures (e.g., recesses, tracks, or both) The piston plate may secure the piston plate insert free of mechanical fasteners, adhesives, or both. For example, the piston plate may be magnetic and configured to magnetically secure the piston plate insert to a surface of the piston plate such that the piston plate simulates deflection of a wall of a brake caliper and controls deflection of the piston plate insert during compression of one or more friction materials, one or more brake pads or both.

The piston plate insert may be positionable anywhere along a surface of the piston plate to simulate a variety of piston configurations of brake caliper systems. The piston plate insert may include one or more engaging mechanisms, one or more receiving mechanisms, or both to connect to the piston plate, to be positioned along the piston plate, or both. The one or more engaging mechanisms may include hooks, pins, latches, fingers, protrusions, fasteners, or a combination thereof. The one or more receiving mechanisms may include channels, recesses, apertures, slots, or a combination thereof. For example, the piston plate may include one or more keys that are received by one or more apertures of the piston plate insert. The piston plate insert may be free of engaging mechanisms. For example, the piston plate insert may be welded directly to the piston plate. The piston plate insert may be shaped substantially similar to the piston plate or may have a dissimilar shape. For example, the piston plate insert may be dimensionally smaller than the piston plate so that a surface of the piston plate insert is nearly entirely supported by the piston plate. The piston plate insert may be structurally rigid. The piston plate insert may contact one or more friction materials during compressibility testing, ultrasonic testing, or both. The piston plate insert may contact a single friction material or brake pad to conduct both compressibility testing and ultrasonic testing. Alternatively, the piston plate insert may contact a plurality of friction materials or brake pads to conduct testing. For example, the piston plate insert may include a plurality of portions configured for different testing so that a first friction material may be contacted by a first portion for compressibility testing while a second friction material may be contacted by a second portion for ultrasonic testing. Each portion may test the respective friction materials sequentially, simultaneously, or both. A friction material located in a first compressibility portion may be tested and then moved to a second ultrasonic testing portion for ultrasonic testing. Each portion may be substantially similar in structure or may be dissimilar. For example, a compressibility portion may include one or more contours, projections, or both to mimic a vehicle environment while an ultrasonic testing portion may include one or more transmitters, receivers, or both to transmit an ultrasonic signal. A plurality of piston plate inserts may be secured to a single piston plate. For example, a first piston plate insert may contact a friction material for compressibility testing while a second piston plate insert may contact a friction material for ultrasonic testing. The number of piston plate inserts secured to the piston plate may simulate a desired brake caliper system. For example, a single piston brake caliper system may be simulated by a single piston plate insert, a double piston brake caliper system may be simulated by a pair of piston plate inserts, a triple piston brake caliper system may be simulated by a plurality of three piston plate inserts, a four-piston brake caliper system may be simulated by a plurality of four piston plate inserts, a five-piston brake caliper system may be simulated by a plurality of five piston plate inserts, or a combination thereof. Alternatively, a single piston plate insert may be secured to a plurality of piston plates. The piston plate insert may include one or more transmitters, one or more receivers, or both for ultrasonic testing. The piston plate insert may include one or more apertures so that the one or more receivers, one or more transmitters, or both extend through or are unobstructed by the piston plate insert. For example, the piston plate insert may include an aperture so that a transmitter located within the piston plate can send a signal through the friction material that is received by a receiver located in the base of the testing machine without sending the signal through the piston plate insert. The piston plate insert may be customizable to mimic a desired vehicle braking environment. For example, the piston plate insert may include one or more piston faces that contact the friction material or brake pad to mimic a brake caliper.

The one or more piston faces may function to contact the friction material, brake pad, or both during ultrasonic testing, compressibility testing, or both to compress the friction material, the brake pad, or both so that one or more tests may be performed. The one or more piston faces may function in conjunction with the piston plate, the piston plate insert, or both to imitate the compression of a friction material or brake pad during a clamping operation of a brake caliper having one or more pistons. The one or more piston faces may protrude from a surface of the piston plate insert. The one or more piston faces may vary in size and shape. For example, the one or more piston faces may be circular, oval, rectangular, square, trapezoidal, or a combination thereof. The one or more piston faces may mirror a shape, size, or both of a desired brake caliper system the one or more friction materials, one or more brake pads, or both will be used in after manufacturing. For example, the one or more piston faces may be a pair of ring-shaped piston faces spaced apart a desired amount to simulate during compressibility testing a braking compression of the one or more friction materials, one or more brake pads, or both in a dual-piston brake caliper assembly. The one or more piston faces may be a ring having an open center on a side of the one or more piston faces that contacts the friction material, the brake pad, or both. The one or more piston faces may be positioned anywhere along the piston plate insert. The one or more piston faces may be spaced apart a desired amount to simulate a spacing of one or more pistons in a brake caliper system the one or more friction materials, one or more brake pads, or both may be used in after assembly. Thus, the compressibility testing may be configured to simulate a compression of the one or more friction materials, one or more brake pads, or both based on an end application or assembly. The one or more piston faces may be integrally formed with the piston plate insert or may be attached to the piston plate insert. A plurality of piston faces may be located on a single piston plate insert. About two or more piston faces, about three or more piston faces, or about four or more piston faces may be located on the piston plate insert. For example, the piston plate insert may include two piston faces to imitate a dual-piston brake caliper for compressibility testing of the friction material, brake pad, or both. About seven or less piston faces, about six or less piston faces, or about five or less piston faces may be located on the piston plate insert. Alternatively, the piston plate insert may include a single piston face (e.g., to imitate a single-piston brake caliper). The piston faces may make annular contact with one or more brake pads, one or more friction materials, or both. The piston faces may make contact with the brake pad, friction material, or both other than annular contact. For example, a contact surface of the piston faces may be X-shaped, butterfly-shaped, box-shaped, or a combination thereof. The piston faces may be a toroid. The piston faces may have one or more open ends, one or more closed ends, or both. The piston faces may be a substantially uniform surface or may include one or more undulations, one or more bends, one or more angles, one or more curves, or a combination thereof. One or more transmitters, receivers, or both may be positioned within the confines of the one or more piston faces. The one or more transmitters, receivers, or both may be concentric with one or more piston faces circular in shape. The one or more transmitters, receivers, or both may be positioned near a centerpoint of the one or more piston faces or anywhere within the confines of the one or more piston faces. The one or more piston faces may include one or more apertures so that the one or more transmitters, one or more receivers, or both may send a signal, receive a signal, or both free of contact with the piston plate insert. The one or more piston faces may be aligned along a shared axis. An entire surface of the one or more piston faces may contact the friction material or brake pad. A surface area of the piston faces that contacts the friction material or brake pad may be less than a surface area if the piston faces were a continuous plane. For example, the surface of the piston faces may be a toroid having a surface area of approximately 30% of a piston face having a continuous plane contacting the friction material or brake pad. The one or more piston faces may have a surface area of about 20% or more, about 30% or more, or about 40% or more of a surface area of a piston face having a continuous plane that contacts the friction material or brake pad. The one or more piston faces may have a surface area of about 70% or less, about 60% or less, or about 50% or less of a surface area a piston face having a continuous plane that contacts the friction material or brake pads. A surface area of a piston face that contacts a friction material or brake pad may be a thickness of the material of the piston face time a circumference of the piston face. A surface area of the one or more piston faces may be any surface area to simulate a substantially similar surface area compared to one or more brake pistons of a brake caliper system the one or more friction materials, one or more brake pads, or both will be assembled within after manufacturing. A plurality of piston faces may contact a single friction material or brake pad. The one or more piston faces may compress the friction material or brake pads so that information may be relayed between the testing machine and an electronic device via wires connecting the electronic device and the testing machine.

The wires may extend through the shaft, the tower, the base, the guide plate, the piston plate, the piston plate insert, additional components of the testing machine, or a combination thereof to power the testing machine, relay data of the testing machine, or both. The wires may connect the testing machine to one or more stages of a manufacturing line to provide feedback or feed-forward communication to one or more manufacturing stages. The wires may connect a transmitter, receiver, or both to one or more additional components of the testing machine. The wires may connect the testing machine to an electronic device.

The electronic device may function to receive data from the testing machine. The electronic device may relay data received from the testing machine to one or more stages of the manufacturing line. The electronic device may function to transmit data to the testing machine. For example, the electronic device may transmit one or more commands to the testing machine to initiate testing, stop testing, adjust one or more testing parameters, or a combination thereof. The electronic device may be a computer, tablet, phone, harddrive, storage device, or a combination thereof. The electronic device may receive data from a compressibility sensor of the testing machine, the receiver of the testing machine, the transmitter of the testing machine, or a combination thereof.

The compressibility sensor may function to monitor the compression of the friction material or brake pad. The compressibility sensor may function to measure one or more compression testing parameters. The compressibility sensor may measure a compression force, a compression duration, a compression distance (e.g., travel distance of the piston plate insert), or a combination thereof. The compressibility sensor may be located anywhere in the testing machine, such as the base, tower, shaft, guide plate, piston plate, piston plate insert, or a combination thereof. The compressibility sensor may be located in an external electronic device and may be connected to the testing machine via one or more wires. The compressibility sensor may be a contacting sensor, non-contacting sensor, or both. The compressibility sensor may communicate with a transmitter, receiver, or both of the testing machine to relay information to an electronic device.

The receiver may function to receive a signal from the transmitter during testing. The signal may be an ultrasonic wave. The receiver may function to transmit a signal to the transmitter. The receiver may be located within the base of the testing machine, the shaft of the testing machine, the guide plate, the piston plate, the piston plate insert, or a combination thereof. The receiver may relay data receiver from the transmitter to the electronic device. The receiver may be positioned substantially in line with the transmitter. A plurality of receivers may receive data from a single transmitter or a plurality or transmitters. Alternatively, a plurality of transmitters may send a signal to a single receiver. The receiver may be in contact with a surface of the friction material. The receiver may apply a load on the friction material during testing. The receiver and the transmitter may maintain a gap between one another during testing, before testing, after testing, or a combination thereof. The receiver may include a sensor that senses the presence of one or more friction material parts. The receiver may be stationary or may move during operation of the testing machine. The receiver may work in conjunction with one or more transmitters to gather test results from the testing machine.

The transmitter may function to transmit a signal to the receiver. The receiver may be located within the base of the testing machine, the shaft of the testing machine, the guide plate, the piston plate, the piston plate insert, or a combination thereof. The transmitter may function to receive a signal from the transmitter during testing. The transmitter may be stationary or may move during testing. For example, the transmitter may move to contact the friction material prior to sending a signal through the friction material to the receiver. The transmitter may send a single signal or may send a plurality or signals to the receiver. The transmitter may be located substantially near a proximal end of the shaft nearest a surface of the friction material positioned on the base of the testing machine. The transmitter may apply a compression force on the friction material during testing. The transmitter may send a signal through the friction material at an angle substantially perpendicular to a surface of the friction material. The transmitter may send a signal through the friction material at an angle other than substantially parallel to the friction material. The transmitter may send a signal through the friction material at an angle of about 15 degrees or more, about 30 degrees or more, or about 45 degrees or more relative to a surface of the friction material. The transmitter may send a signal through the friction material at an angle of about 90 degrees or less, about 75 degrees or less, or about 60 degrees or less relative to the surface of the friction material. The transmitter may send a first signal at a first angle relative to a surface of the friction material and send a second subsequent signal at a second angle relative to the surface of the friction material. The first and second angles may be substantially similar or may be different. The transmitter may send a signal through the friction material based on a command from a controller of the testing machine.

The controller may function to control one or more activities of the testing machine. The controller may initiate a testing sequence of the friction material, stop testing of the friction material, adjust one or more parameters of the testing process, communicate with one or more secondary electronic devices, communicate with one or more stages of a manufacturing line, power on the testing machine, shut down the testing machine, or a combination thereof. The controller may include one or more electronic components such as a printed circuit board (PCB), capacitor, resistor, transistor, wires, microprocessor, memory unit, sensor, or a combination thereof. The controller may include one or more switches, one or more buttons, one or more levers, or a combination thereof to receive input from a user. The controller may be in direct or indirect communication with the electronic device, compressibility sensor, or both. The controller may be mounted to the wall, the shaft, the base, the tower, or a combination thereof. The controller may control the shaft, transmitter, receiver, or a combination thereof. The controller may include a display.

The display may function to provide users a visual identification of the ultrasonic testing. The display may indicate a status of the testing machine, one or more parameters of the testing machine, test results, or a combination thereof. The display may be a monitor. The monitor may be a light-emitting diode (LED) display, a liquid crystal display (LCD), a plasma display, or a combination thereof. The display may power one and off based on the controller powering on and off the testing machine. Alternatively, the display may remain on while the testing machine is powered off or in a standby mode. The display may be mounted to the controller, the wall, the shaft, the base, the tower, or a combination thereof Turning now to the figures, FIG. 1 illustrates a perspective view of a brake pad 200. The brake pad 200 includes a friction material 210 disposed on a pressure plate 220.

FIG. 2 illustrates a perspective view of a combination ultrasonic and compressibility testing machine 400 wirelessly communicating with an electronic device 500. The testing machine 400 includes a base 402 and a tower 404 projecting from the base 402. The tower 404 includes a shaft 406 having a transmitter 408 positioned on a distal end of the shaft 406. The transmitter 408 opposes a receiver 410 located on the base 402 so that a brake pad (or a component thereof) may be placed between the transmitter 408 and the receiver 410 to measure material properties of the brake pad via the testing machine 400. For example, the transmitter 408 and the receiver 410 may contact opposing sides of a brake pad to send an ultrasonic signal between the transmitter 408 and the receiver 410. Additionally, the brake pad may be positioned on the receiver 410 and the shaft 406 may extend towards the brake pad so that the transmitter 408 compresses the brake pad and a compressibility sensor 512 within the testing machine 400 tracks one or more test values of the compression. A wall 412 may project from the base 402 and include a controller 416 connected to the transmitter 408, the receiver 410, or both via one or more wires 510 to control the testing machine 400 and dictate whether the testing machine 400 performs ultrasonic testing, compressibility testing, or both. The controller 416 may include a display 418 to visually monitor activity of the testing machine 400. It should be noted that a single testing machine 400 or a plurality of testing machines 400 may be positioned within a manufacturing line of the brake pads to provide inline testing, manufacturing feedback, or both.

FIG. 3 illustrates a close-up perspective view of a combination ultrasonic and compressibility testing machine 400. The testing machine 400 includes a base 402 and a tower 404 positioned over the base 402. The tower 404 includes a shaft 406 having a transmitter 408 positioned on a distal end of the shaft 406. The transmitter 408 opposes a receiver 410 located on the base 402 so that a brake pad 200 may be placed between the transmitter 408 and the receiver 410 to measure material properties of the brake pad 200 via the testing machine 400. It should be noted that the testing machine 400 may measure material properties of the pressure plate 220 of the brake pad 200, the friction material 210 disposed on the pressure plate 220, or both. The testing machine 400 may also measure material properties of only the pressure plate 220, the friction material 210, or both (i.e., only the pressure plate 220 or the friction material 210 is positioned on the testing machine, not the entire brake pad 200). The shaft 406 further includes a guide plate 420 that guides and maintains orientation of the transmitter 408 during movement of the shaft 406. For example, once the brake pad 200 is positioned on the receiver 410 of the base 402, the shaft 406 extends in a compression direction ($D_C$) until the brake pad 200 is sandwiched between the transmitter 408 and the receiver 410. During movement in the compression direction ($D_C$), a plurality of pins 424 located within sleeves 422 of the guide plate 420 contact the base 402 to maintain orientation of the shaft 406. As the shaft 406 continues to move in the compression direction ($D_C$) and the pins 424 are in contact with the base 402, the pins 424 begin to move in a direction opposing the compression direction ($D_C$) until a nut 426 on each pin abuts their respective sleeve 422, preventing further movement of the shaft 406 in the compression direction ($D_C$). A compressibility sensor 512 may measure one or more test values pertaining to the compression of the brake pad 200 during testing based on the travel of the shaft 406, compression of the brake pad 200, or both. Once testing of the brake pad 200 is complete, the shaft 406 is released and moved in a release direction ($D_R$) back to an initial position. Additionally, one or more testing machines 400 may be positioned within a manufacturing line so that brake pads 200 are tested inline and continuously moved through the one or more testing machines 400 in a manufacturing direction (M). It should also be noted that the one or more testing machines 400 may test a plurality of brake pads 200 simultaneously in a continuous manner, in batches, or both.

FIG. 4 illustrates a close-up perspective view of a combination ultrasonic and compressibility testing machine 400. The testing machine 400 includes a base 402 and a tower 404 positioned over the base 402. The tower 404 includes a shaft 406 having a transmitter 408 positioned on a distal end of the shaft 406. The transmitter 408 opposes a receiver 410 located on the base 402 so that a brake pad 200 may be placed between the transmitter 408 and the receiver 410 to measure material properties of the brake pad 200 via the testing machine 400. It should be noted that the testing machine 400 may measure material properties of the pressure plate 220 of the brake pad 200, the friction material 210 disposed on the pressure plate 220, or both. The testing machine 400 may also measure material properties of only the pressure plate 220, the friction material 210, or both (i.e., only the pressure plate 220 or the friction material 210 is positioned on the testing machine, not the entire brake pad 200). The shaft 406 further includes a guide plate 420 that guides and maintains orientation of the transmitter 408 during movement of the shaft 406. For example, once the brake pad 200 is positioned on the receiver 410 of the base 402, the shaft 406 extends in a compression direction ($D_C$) until the brake pad 200 is sandwiched between the transmitter 408 and the receiver 410. During movement in the compression direction ($D_C$), a plurality of pins 424 located within sleeves 422 of the guide plate 420 contact a compression plate 428 secured to the base 402 via a plurality of biasing members 430 to maintain orientation of the shaft 406. As the shaft 406 continues to move in the compression direction ($D_C$) and the pins 424 are in contact with the compression plate 428, the pins 424 begin to move in a direction opposing the compression direction ($D_C$) until a nut 426 on each pin abuts their respective sleeve 422, and one or more of the biasing members 430 compress in the compression direction ($D_C$) until the compression plate 428 contacts the receiver 410 of the base 402, thereby preventing further movement of the shaft 406 in the compression direction ($D_C$). A compressibility sensor 512 may measure one or more test values pertaining to the compression of the brake pad 200 during testing based on the travel of the shaft 406, compression of the brake pad 200, or both. Once testing of the brake pad 200 is complete, the shaft 406 is released and moved in a release direction ($D_R$) back to an initial position, thereby releasing the compression plate 428 and returning the one or more biasing members 430 back to an uncompressed position. Additionally, one or more testing machines 400 may be positioned within a manufacturing line so that brake pads 200 are tested inline and continuously moved through the one or more testing machines 400 in a manufacturing direction (M). It should also be noted that the one or more testing machines 400 may test a plurality of brake pads 200 simultaneously in a continuous manner, in batches, or both.

Figure 5:
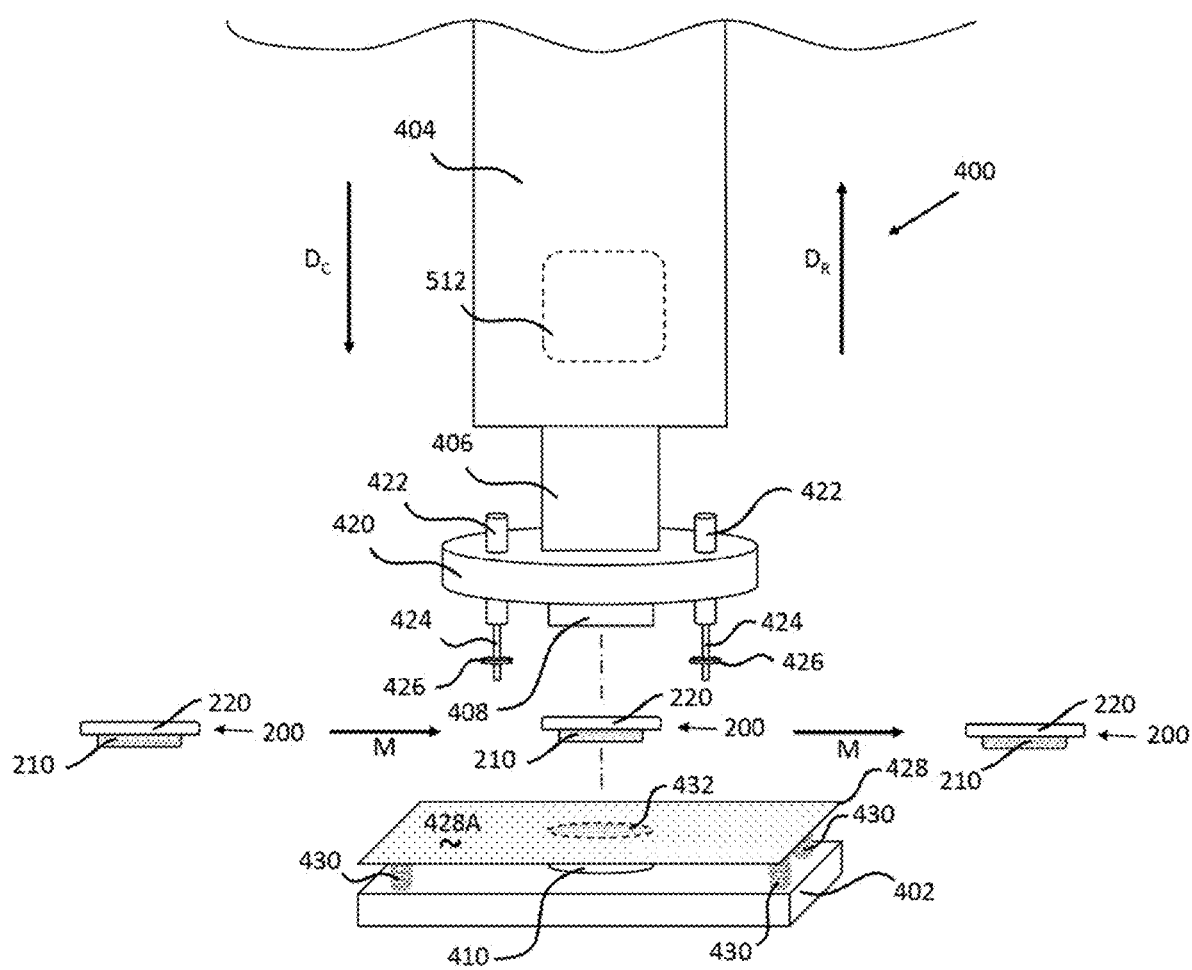
FIG. 5 is a close-up perspective view of a combination ultrasonic and compressibility testing machine.

FIG. 5 illustrates a close-up perspective view of a combination ultrasonic and compressibility testing machine 400. The testing machine 400 includes a base 402 and a tower 404 positioned over the base 402. The tower 404 includes a shaft 406 having a transmitter 408 positioned on a distal end of the shaft 406. The transmitter 408 opposes a receiver 410 located on the base 402 so that a brake pad 200 may be placed between the transmitter 408 and the receiver 410 to measure material properties of the brake pad 200 via the testing machine 400. It should be noted that the testing machine 400 may measure material properties of the pressure plate 220 of the brake pad 200, the friction material 210 disposed on the pressure plate 220, or both. The testing machine 400 may also measure material properties of only the pressure plate 220, the friction material 210, or both (i.e., only the pressure plate 220 or the friction material 210 is positioned on the testing machine, not the entire brake pad 200). The shaft 406 further includes a guide plate 420 that guides and maintains orientation of the transmitter 408 during movement of the shaft 406. For example, once the brake pad 200 is positioned on the receiver 410 of the base 402, the shaft 406 extends in a compression direction ($D_C$) until the brake pad 200 is sandwiched between the transmitter 408 and the receiver 410. During movement in the compression direction ($D_C$), a plurality of pins 424 located within sleeves 422 of the guide plate 420 contact a compression plate 428 secured to the base 402 via a plurality of biasing members 430 to maintain orientation of the shaft 406. The compression plate 428 further includes a contact sheet 428A so that the brake pad 200 is free of direct contact with the compression plate 428. As the shaft 406 continues to move in the compression direction ($D_C$) and the pins 424 are in contact with the compression plate 428, the pins 424 begin to move in a direction opposing the compression direction ($D_C$) until a nut 426 on each pin abuts their respective sleeve 422, and one or more of the biasing members 430 compress in the compression direction ($D_C$) until the compression plate 428 contacts the receiver 410 of the base 402, thereby preventing further movement of the shaft 406 in the compression direction ($D_C$). Upon contact, the receiver 410 may protrude from an aperture 432 extending through the compression plate 428 and the contact sheet 428A so that the receiver 410 directly contacts the brake pad 200. A compressibility sensor 512 may measure one or more test values pertaining to the compression of the brake pad 200 during testing based on the travel of the shaft 406, compression of the brake pad 200, or both. Once testing of the brake pad 200 is complete, the shaft 406 is released and moved in a release direction ($D_R$) back to an initial position, thereby releasing the compression plate 428 and returning the one or more biasing members 430 back to an uncompressed position. Additionally, one or more testing machines 400 may be positioned within a manufacturing line so that brake pads 200 are tested inline and continuously moved through the one or more testing machines 400 in a manufacturing direction (M). It should also be noted that the one or more testing machines 400 may test a plurality of brake pads 200 simultaneously in a continuous manner, in batches, or both.

Figure 6:
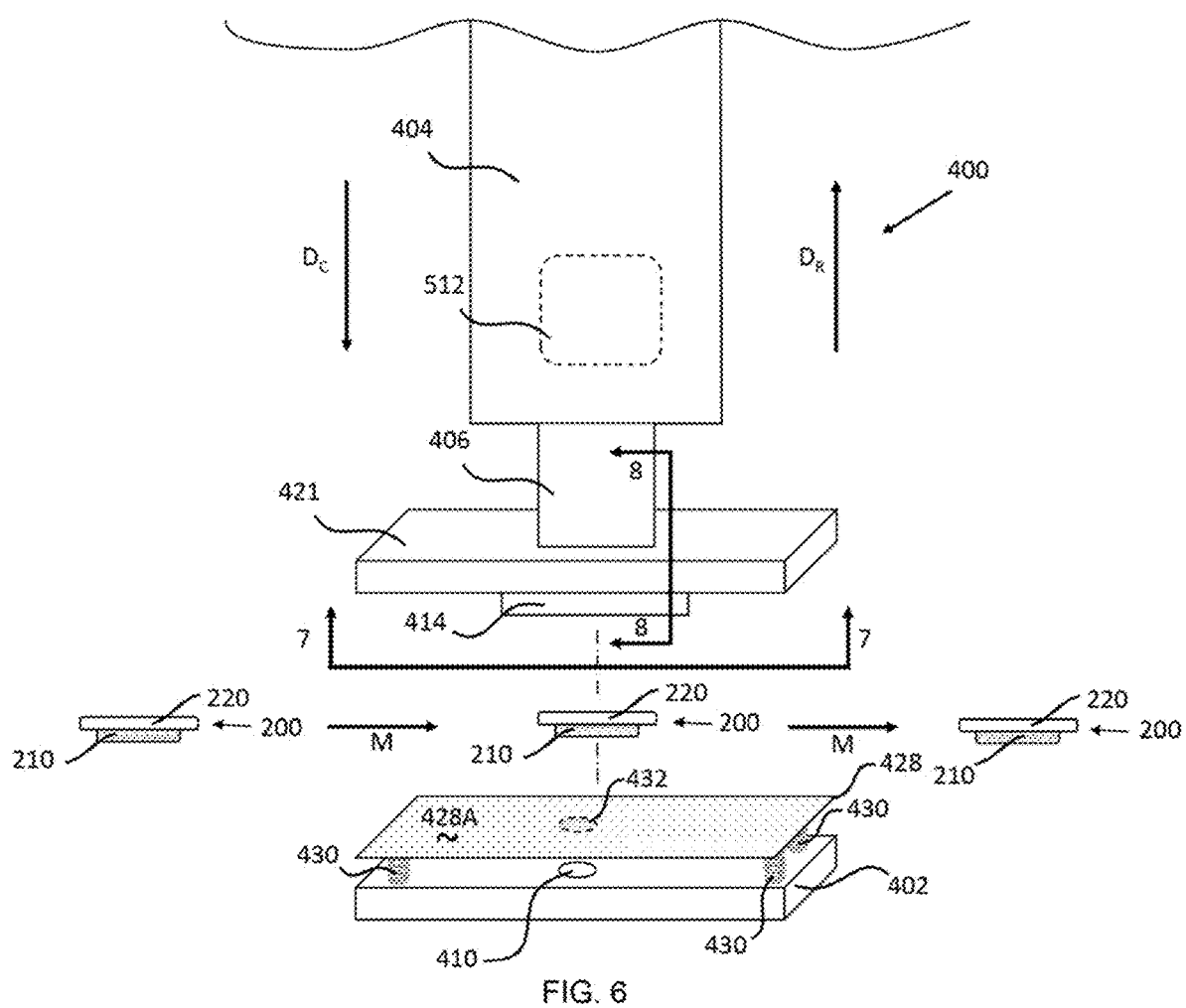
FIG. 6 is a close-up perspective view of a combination ultrasonic and compressibility testing machine.

FIG. 6 illustrates a close-up perspective view of a combination ultrasonic and compressibility testing machine 400. The testing machine 400 includes a base 402 and a tower 404 positioned over the base 402. The tower 404 includes a piston plate 421 that compresses a piston plate insert 414 during movement of the shaft 406. The piston plate insert 414 may include a transmitter that opposes a receiver 410 located on the base 402 so that a brake pad 200 may be placed between the transmitter and the receiver 410 to measure material properties of the brake pad 200 via the testing machine 400 (see FIGS. 7A-7D and 8). For example, once the brake pad 200 is positioned on the receiver 410 of the base 402, the shaft 406 extends in a compression direction ($D_C$) until the brake pad 200 is sandwiched between the piston plate insert 414 and the receiver 410. It should be noted that the testing machine 400 may measure material properties of the pressure plate 220 of the brake pad 200, the friction material 210 disposed on the pressure plate 220, or both. The testing machine 400 may also measure material properties of only the pressure plate 220, the friction material 210, or both (i.e., only the pressure plate 220 or the friction material 210 is positioned on the testing machine, not the entire brake pad 200). The compression plate 428 further includes a contact sheet 428A so that the brake pad 200 is free of direct contact with the compression plate 428. As the shaft 406 continues to move in the compression direction ($D_C$) and the piston plate insert 414 compresses the brake pad 200 into the contact sheet 428A, one or more of biasing members 430 compress in the compression direction ($D_C$) until the compression plate 428 contacts the receiver 410 of the base 402, thereby preventing further movement of the shaft 406 in the compression direction ($D_C$). Upon contact, the receiver 410 may protrude from an aperture 432 extending through the compression plate 428 and the contact sheet 428A so that the receiver 410 directly contacts the brake pad 200. A compressibility sensor 512 may measure one or more test values pertaining to the compression of the brake pad 200 during testing based on the travel of the shaft 406, compression of the brake pad 200, or both. Once testing of the brake pad 200 is complete, the shaft 406 is released and moved in a release direction ($D_R$) back to an initial position, thereby releasing the compression plate 428 and returning the one or more biasing members 430 back to an uncompressed position. Additionally, one or more testing machines 400 may be positioned within a manufacturing line so that brake pads 200 are tested inline and continuously moved through the one or more testing machines 400 in a manufacturing direction (M). It should also be noted that the one or more testing machines 400 may test a plurality of brake pads 200 simultaneously in a continuous manner, in batches, or both.

FIG. 7A is an example of cross-section 7-7 of FIG. 6. The testing machine 400 includes a piston plate insert 414 secured to a piston plate 421. A plurality of piston faces 415 are disposed on an exterior surface of the piston plate insert 414 to contact one or more brake pads during compressibility testing, ultrasonic testing, or both to mimic compression of one or more brake pads during vehicle braking (see FIGS. 3-6). A transmitter 408 extends through one of the piston faces 415 to contact the one or more brake pads during testing.

FIG. 7B is an example of cross-section 7-7 of FIG. 6. The testing machine 400 includes a piston plate insert 414 secured to a piston plate 421. A plurality of piston faces 415 are disposed on an exterior surface of the piston plate insert 414 to contact one or more brake pads during compressibility testing, ultrasonic testing, or both to mimic compression of one or more brake pads during vehicle braking (see FIGS. 3-6). A transmitter 408 is positioned on the piston plate insert 414 near the piston faces 415 and extends through the piston plate insert 414.

FIG. 7C is an example of cross-section 7-7 of FIG. 6. The testing machine 400 includes a piston plate insert 414 secured to a piston plate 421. The piston plate insert 414 includes a compressibility portion 414A and an ultrasonic testing portion 414B. The compressibility portion 414A includes a plurality of piston faces 415 disposed on an exterior surface of the piston plate insert 414 to contact one or more brake pads during compressibility testing to mimic compression of one or more brake pads during vehicle braking. The ultrasonic testing portion 414B includes a transmitter 408 that contacts the one or more brake pads during ultrasonic testing. It should be noted that the one or more brake pads may move through the testing machine 400 in a manufacturing direction so that the one or more brake pads are initially tested in the compression portion 414A and then moved to the ultrasonic testing portion 414B, or vice versa (see FIGS. 3-6).

FIG. 7D is an example of cross-section 7-7 of FIG. 6. The testing machine 400 includes a plurality of piston plate inserts 414 secured to a piston plate 421. A first piston plate insert 414 forms a compressibility portion 414A and a second piston plate insert 414 forms an ultrasonic testing portion 414B. The compressibility portion 414A includes a plurality of piston faces 415 disposed on an exterior surface of the first piston plate insert 414 to contact one or more brake pads during compressibility testing to mimic compression of one or more brake pads during vehicle braking. The ultrasonic testing portion 414B includes a transmitter 408 positioned on the second piston plate insert 414 that contacts the one or more brake pads during ultrasonic testing. It should be noted that the one or more brake pads may move through the testing machine 400 in a manufacturing direction so that the one or more brake pads are initially tested in the compression portion 414A and then moved to the ultrasonic testing portion 414B, or vice versa (see FIGS. 3-6).

Figure 8:
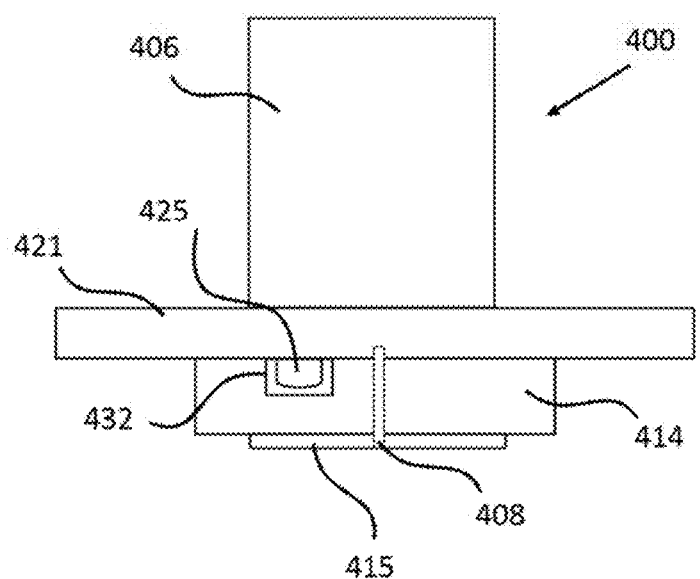
FIG. 8 is cross-section 8-8 of FIG. 6.

FIG. 8 is cross-section 8-8 of FIG. 6. The testing machine 400 includes a piston plate 421 secured to a distal end of a shaft 406. A piston plate insert 414 is secured to a surface of the piston plate 421 and positioned relative to the piston plate 421 via one or more keys 424A received by one or more guide recesses 432 of the piston plate insert 414. It should be noted that the piston plate 420 may also magnetically secure the piston plate insert 414 so that the piston plate insert 414 moves along the one or more keys 424A via one or more ball bearings located near a distal end of the one or more keys 424A (not shown). The piston plate insert 414 further includes one or more piston faces 415 protruding from the piston plate insert 414 to contact one or more brake pads during compressibility testing to mimic compression of one or more brake pads during vehicle braking. A transmitter 408 extends through the piston plate insert 414, the piston plate 420, or both so that the transmitter 408 contacts the one or more brake pads during testing and sends a signal to a respective receiver of the testing machine 400 (see FIGS. 3-6).

ELEMENT LIST

200 Brake Pad
210 Friction Material
220 Pressure Plate
400 Testing Machine
402 Base
404 Tower
406 Shaft
408 Transmitter
410 Receiver
412 Wall
414 Piston Plate Insert
414A Compressibility Portion
414B Ultrasonic Testing Portion
415 Piston Face
416 Controller
418 Display
420 Guide Plate
421 Piston Plate
422 Sleeve
424 Pin
425 Key
426 Nut
428 Compression Plate
428A Contact Sheet
430 Biasing Member
432 Aperture
500 Electronic Device
510 Wire
512 Compressibility Sensor
M Manufacturing Direction
$D_C$ Compression Direction (of the Testing Machine)
$D_R$ Release Direction (of the Testing Machine)

What is claimed is:

1. A testing machine comprising:
   a. a transmitter;
   b. a receiver opposing the transmitter and located in a base of the testing machine;
   c. a compressibility sensor in communication with the transmitter, the receiver, or both; and
   d. a compression plate compressibly engaged to the base of the testing machine to support one or more objects, wherein the receiver protrudes through an aperture of the compression plate to directly contact the one or more objects when the one or more objects and the compression plate are compressed in a direction towards the receiver;
   wherein the testing machine transmits a signal between the transmitter and the receiver to perform ultrasonic testing and further performs compressibility testing of the one or more objects positioned between the transmitter and the receiver.

2. The testing machine according to claim 1, wherein transmitter is mounted to a distal end of a shaft that movably opposes the receiver; and wherein the transmitter compresses the one or more objects between the transmitter and the receiver and communicates with the compressibility sensor to measure one or more values of the compressibility testing.

3. The testing machine according to claim 1, wherein the compression plate compressibly engages the base of the testing machine via one or more biasing members.

4. The testing machine according to claim 1, wherein the testing machine further comprises a piston plate mounted to a shaft movably opposing the base of the testing machine, and one or more piston plate inserts are secured to the piston plate and configured to compress the one or more objects between the one or more piston plate inserts and the base.

5. The testing machine according to claim 4, wherein the one or more piston plate inserts include one or more piston faces protruding from a surface of the one or more piston plate inserts.

6. The testing machine according to claim 4, wherein the transmitter extends through the piston plate, the one or more piston plate inserts, or both to transmit the signal to the receiver for the ultrasonic testing during compression of the one or more objects.

7. The testing machine according to claim 4, wherein the one or more piston plate inserts includes a compressibility portion having one or more piston faces protruding from a surface of the one or more piston plate inserts that compress the one or more objects, and an ultrasonic testing portion that houses the transmitter of the testing machine.

8. The testing machine according to claim 7, wherein the one or more objects are initially compressed between the base and the compressibility portion, moved in a manufacturing direction, and then sandwiched between the ultrasonic testing portion and the base to transmit the signal between the transmitter and the receiver.

9. The testing machine according to claim 7, wherein the one or more objects are initially sandwiched between the ultrasonic testing portion and the base to transmit the signal between the transmitter and the receiver, moved in a manufacturing direction, and then compressed between the base and the compressibility portion.

10. The testing machine according to claim 4, wherein the one or more piston plate inserts include an aperture that receives a key of the piston plate to maintain position of the one or more piston plate inserts relative to the piston plate.

11. The testing machine according to claim 10, wherein the one or more piston plate inserts are magnetically secured to the piston plate.

12. The testing machine according to claim 1, wherein the one or more objects is a brake pad.

13. The testing machine according to claim 1, wherein the testing machine is in communication with one or more electronic devices to record and relay results of the ultrasonic testing, compressibility testing, or both.

14. The testing machine according to claim 1, further comprising a controller to control when the testing machine performs ultrasonic testing, compressibility testing, or both.

15. The testing machine according to claim 1, wherein the testing machine is part of a closed-loop system.

16. The testing machine according to claim 1, wherein the testing machine determines a Young's modulus and compressibility characteristics of the one or more objects in a nondestructive manner.

17. A manufacturing line for friction material of brake pads, comprising a plurality of inline testing machines according to claim 1.

18. A method, comprising the steps of:
a. placing one or more friction materials of one or more brake pads on the receiver of the testing machine according to claim 1;
b. moving the transmitter positioned on a distal end of a shaft opposing the receiver to compress the one or more friction materials between the transmitter and the receiver; and
c. performing ultrasonic testing and compressibility testing within a manufacturing line of the one or more friction materials to determine if each of the one or more friction materials meet one or more desired material properties.

19. A testing machine, comprising:
a. a transmitter positioned near a distal end of a movable shaft;
b. a receiver opposing the transmitter and positioned on a base of the testing machine;
c. a compressibility sensor in communication with the transmitter, the receiver, or both; and
d. a compression plate compressibly engaged to the base via one or more biasing members,
wherein the compression plate supports one or more friction materials of one or more brake pads, and the receiver protrudes through an aperture of the compression plate to directly contact the one or more brake pads when the one or more brake pads and the compression plate are compressed in a direction towards the receiver.

20. The testing machine according to claim 19, wherein the compression plate includes a contact sheet disposed on a surface of the compression plate so the one or more friction materials of the one or more brake pads are free of direct contact with the compression plate.

* * * * *